United States Patent
Bux et al.

(10) Patent No.: US 8,131,017 B2
(45) Date of Patent: Mar. 6, 2012

(54) AUTOMATIC ILLUMINATING SYSTEM FOR A CONTACTLESSLY MEASURING AUTOMOBILE SERVICE DEVICE

(75) Inventors: Hermann Bux, Adelzhausen (DE); Ulrich Bichlmeier, Muehldorf a. Inn (DE); Stefan Schommer, Unterschleissheim (DE)

(73) Assignee: Beissbarth GmbH, Munich (DE)

( * ) Notice: Subject to any disclaimer, the term of this patent is extended or adjusted under 35 U.S.C. 154(b) by 877 days.

(21) Appl. No.: 11/914,737

(22) PCT Filed: Apr. 27, 2006

(86) PCT No.: PCT/EP2006/003941
§ 371 (c)(1),
(2), (4) Date: Jun. 24, 2008

(87) PCT Pub. No.: WO2006/122640
PCT Pub. Date: Nov. 23, 2006

(65) Prior Publication Data
US 2008/0267441 A1  Oct. 30, 2008

(30) Foreign Application Priority Data
May 17, 2005  (DE) .......................... 10 2005 022 565

(51) Int. Cl.
*G06K 9/00* (2006.01)
*H04N 9/47* (2006.01)
*H04N 7/18* (2006.01)
*G06F 19/00* (2006.01)

(52) U.S. Cl. ............ 382/104; 382/141; 348/92; 348/95; 700/109

(58) Field of Classification Search .................. 382/100, 382/104, 141; 700/109; 348/92
See application file for complete search history.

(56) References Cited

U.S. PATENT DOCUMENTS

| 5,018,853 | A  | * | 5/1991 | Hechel et al. ................. 356/155 |
| 7,860,295 | B2 | * | 12/2010 | Donner et al. ................. 382/141 |
| 2005/0060899 | A1 | * | 3/2005 | Jackson et al. ............. 33/203.18 |
| 2007/0283582 | A1 | * | 12/2007 | Donner et al. .................. 33/228 |

FOREIGN PATENT DOCUMENTS
WO   WO 2004/059575   *   7/2004
* cited by examiner

*Primary Examiner* — Andrew W Johns
*Assistant Examiner* — Shefali Goradia
(74) *Attorney, Agent, or Firm* — ARC IP Law, PC; Joseph J. Mayo

(57) ABSTRACT

Automatic illuminating and image recording system for an automobile service device, combined illuminating and image recording unit and method for automatic measured value-dependent setting of the image recording and exposure for an automobile service device having contactless measuring capability. Comprises at least one camera (32, 34) having an interface to a control unit, at least one illuminating unit (62, 64) having a control input, and a control unit. This control unit is equipped with an interface to the camera(s) (32, 34), with an interface to the illuminating unit(s) (62, 64), with an image processing-and, respectively, image pre-processing-unit and with an evaluating unit that generates control parameters for the illuminating unit(s) (62, 64) and/or the camera(s) (32, 34).

17 Claims, 2 Drawing Sheets

AUTOMATIC ILLUMINATING SYSTEM FOR A CONTACTLESSLY MEASURING AUTOMOBILE SERVICE DEVICE

This application is a national stage entry under 35 U.S.C. 371 of international patent application PCT/EP2006/003941, filed 27 Apr. 2006 which claims priority to German patent application 10 2005 022 565.9, filed 17 May 2005, the specifications of which are both hereby incorporated herein by reference.

BACKGROUND OF THE INVENTION

1. Field of the Invention

Automatic illuminating and image recording system for an automobile service device, combined illuminating and image recording unit and method for automatic measured value-dependent setting of the image recording and the exposure for an automobile service device having contactless measuring capability.

2. Description of the Related Art

From the German patent application DE 10 2004 013 441.3, a measuring method, a measuring unit and a measuring apparatus for the measurement of a running gear for determination of the spatial position of a wheel rim are known. This patent application describes an algorithm for modeling of an osculating torus for the contactless measurement of a running gear. With such apparatus for measurement of a running gear operating in a contactless manner, images of a wheel or a wheel rim are captured and processed in order to determine the wheel plane being spanned by the rim flange/rim horn.

The setting of the illumination by the illumination units or the exposure of the optical receiving units is carried out by a user or is based on generally valid assumptions and methods.

It is a drawback of this method and of these devices and apparatus for measuring a running gear that the determined results are not satisfying when the circumstances of illumination and the exposure settings are insufficient.

BRIEF SUMMARY OF THE INVENTION

It is therefore an object of the present invention to provide an automated illuminating and recording system and a method therefor by which the illumination of the particularly relevant portions of the viewed object and the image quality of the optical receiving unit are improved. Thereby the results determined by the contactless measurement of the running gear are to be improved.

This object is solved by the subject matter of the independent claims. Advantageous embodiments are comprised in the dependent claims.

An automated illuminating and image recording system for an automobile service device, especially for an automobile service device or for a system for measurement of a running gear/wheel alignment system that are measuring in a contactless manner, comprises at least one optical receiving unit having an interface to a control unit, at least one illuminating unit having a control input and a control unit being equipped with an interface to the optical receiving unit(s), with an interface to the illuminating unit(s), with an image processing—and, respectively, image pre-processing-unit and with an evaluating unit. The image processing—and, respectively, image pre-processing-unit receives images from the optical receiving unit(s) and determines for the case of the application specific features of the image(s). The evaluating unit generates control parameters for the illuminating unit(s) and/or for the optical receiving unit(s) from the images of the optical receiving unit(s) and from the determined specific features.

According to an underlying idea of the invention this automatic illumination and image recording system is not based on fixed assumptions and settings which are predetermined by a user, but rather on a result-specific local consideration and inspection of the generated images. Thereby the invention emanates from the finding that the illumination and the adjusting of the illumination to the requirements of the image processing is a critical factor in the contactless measurement of a running gear/contactless wheel alignment besides the algorithms.

The specific features of the image generated by the image processing—and, respectively, image pre-processing-unit can be generated in a conventional manner known to the skilled person and especially according to the image processing and image pre-processing being described in the above-mentioned German patent application. Generated specific features of the image thus relate to the factual conditions of the described area of application and, respectively, the measuring task, for example the rim, the wheelhouse edge, the valve or an emblem.

The local exposure valuation is a quality valuation of the viewed image portions and can already be a partial result of the image processing and, respectively, the image pre-processing. The control parameters generated by the evaluating unit can be generated both for the optical receiving unit and for the illumination unit. The exposure control optimizes the image portion of interest independently from the remaining image and thus improves the calculation result which in turn is a basis for the exposure control.

For practical reasons, a dynamic threshold value be set which keeps the permanent after-parameterization within its limits or prevents it.

According to a first embodiment of the automated illuminating and image recording system, the optical receiving unit can be formed as CMOS- or CCD camera and it can comprise an electronics, integrated housing components, an objective which does not necessarily comprise a fixed focal length but can do so, a filter for optimization of an IR-signal in regard to IR-spectrum of the sun and for blinding out of the ambient light, especially a band-pass filter and a power supply. In this context, the integrated housing components can be understood both as integration of the housing within the arrangement and as integration of the arrangement into the housing.

The illuminating unit can be designed for an illumination in the visible or non-visible range, especially in the IR-range. It can be formed as LED-light as well.

According to circumstances of space or illumination requirements either one single plane or punctiform illumination unit or a plurality of illumination units can be provided. They can be formed as two respective illumination units in different orientations also referred to stereo-arrangement, or they can be arranged annularly around the optical receiving unit, which results in a particularly uniform illumination of the object to be viewed.

When the illumination unit(s) is/are arranged together with the optical receiving unit or are integrated with it within a housing, a particularly compact and space-saving configuration is achieved. Alternatively, it is possible as a matter of course to set up the illuminating units separately from the optical receiving unit.

In the image processing performed by the image processing—and, respectively, image pre-processing-unit, features from the image processing, especially the rim edge, the wheel house edge, the footprint/contact area, the valve position, the wheel nuts, the balancing weight, an emblem at the rim or a writing at the tire are used.

The image processing—and, respectively, image pre-processing unit and the evaluating unit can dynamically select an image portion for the generation of the control parameters.

This dynamic selection is carried out by examining the entire image portion or a partial portion of the image, for example a ¼ or a ⅛ image portion for significant/distinctive geometric forms and especially by pre-segmenting it roughly in order to find concentric circles, by determining the image portion to be evaluated, especially in the area of circles, of segments of a circle between tire and rim and of circumferential lines of the circles, and by determining out of it control parameters for the set image portion.

By doing so, parts of the image portion can be blinded out in order to optimize the illumination in particularly relevant portions, especially the topmost and lowermost and, respectively, foremost and most rearward rim areas.

With the control parameters generated that way the settings of the optical receiving unit and the illuminating unit can be adjusted to the requirements of the image processing. Furthermore, the image portions to be viewed can be set individually. This results in a significant improvement of the results generated by the automobile service device.

According to an advantageous embodiment of the invention the selection of the image portion and/or the setting of the illuminating unit(s) and/or the optical receiving unit(s) can be changed in a further cycle/run. By comparison of the results of two or more separate test runs with unchanged position of the object, the illuminating units and the optical receiving units and, respectively, modified settings of the illuminating units and the optical receiving units, the settings of the illuminating units and the optical receiving units can be optimized.

If no control parameters have been determined for the set image portion or if they are insufficient, the selection of the image portion should in either case be repeated with other basic settings of the illuminating units and the optical receiving units.

The control parameters for the illuminating units are the illumination time and the intensity of illumination. The control parameters for the optical receiving units are the exposure time and/or the diaphragm and objective settings, which requires costly cameras with separate calibration, and/or the filter settings.

The invention also relates to a combined illuminating and image recording unit having an integrated camera and having a plurality of light sources arranged around the integrated camera, said light sources pointing into the same direction as the integrated camera. The light sources can be provided as LEDs resulting in a particularly uniform illumination of the object to be viewed and a particularly compact and space-saving configuration.

The invention further relates to a method for automated measured value-dependent setting of the image recording and exposure for a automobile service device or system for measuring a running gear/wheel alignment system having contactless measuring capability. This method provides the steps of operating at least one illuminating unit with a predetermined intensity of illumination and illumination time, recording at least one image of an object, especially of a wheel or a wheel rim by at least one optical receiving unit having a predetermined objective setting, exposure time and diaphragm opening, receiving of the image(s) of the object, determining of specific features of the image(s) of the object by an image processing- and, respectively, image pre-processing-unit, generating of control parameters for the illuminating unit(s) and/or for the optical receiving unit(s) from the image(s) and from the specific features as well as controlling the illuminating unit(s) and/or the optical receiving unit(s) with the control parameters.

By this method for automatic measured value-dependent setting of the illumination and the exposure according to the invention the results of the contactless measurement of the running gear/wheel alignment measurement can be significantly improved. This method is based on a result specific local image inspection and avoids the drawbacks of illumination and exposure regulations that are based on user instructions or on general estimated values.

According to an advantageous embodiment of the method the determination of the specific features of the image(s) of the object is carried out by examining the entire image portion or a partial image portion for significant/distinctive geometric forms and especially by a rough pre-segmentation in order to find concentric circles, by determining the image portions to be evaluated, especially in the area of circles, of segments of a circle between tire and rim and of circumferential lines of the circles; and by optional blinding out parts of the image portions for optimization of the illumination in particularly relevant portions, especially in topmost and lowermost and, respectively, foremost and most rearward rim portions.

As already described above, the above-mentioned method steps can be repeated with changed settings of the illuminating units and/or the optical receiving units and/or for other image portions, in order to further improve the determined results. If for example during the last run/cycle of the method steps, where the diaphragm opening had been increased and/or the intensity of illumination had been increased, the results have been improved in regard to the run before the last run of the method steps, this is an indication that for example a further increase of the diaphragm opening, extension of the exposure time and increase of the intensity of illumination could be carried out.

If however the results have deteriorated, then the diaphragm opening should be decreased again and/or the exposure time should be reduced and/or the intensity of illumination should be decreased again.

If no or only insufficient control parameters have been determined for the set image portion the method steps should be repeated in either case.

It is advantageous if the control parameters are determined according to fixed quality criteria.

BRIEF DESCRIPTION OF THE DRAWINGS

The invention is further illustrated by means of an embodiment with reference to the accompanying drawings, wherein.

DETAILED DESCRIPTION OF THE INVENTION

Figure 1:
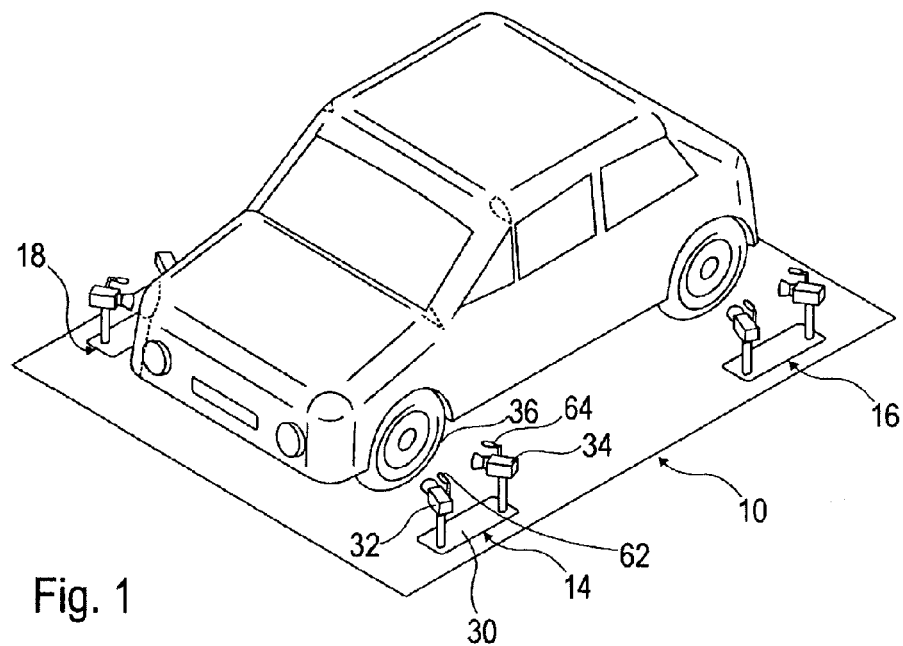
FIG. 1 shows a measuring site on which a motor vehicle having four wheels stands the running gear/chassis of which shall be measured.

FIG. 1 shows a measuring site 10, on which a motor vehicle 12 having four wheels 36 stands, the running gear/chassis of which motor vehicle 12 shall be measured. On the measuring site 10, four measuring units are statically arranged, three of which measuring units 14, 16, 18 are shown while the fourth measuring unit is covered up through the motor vehicle 12.

Figure 2:
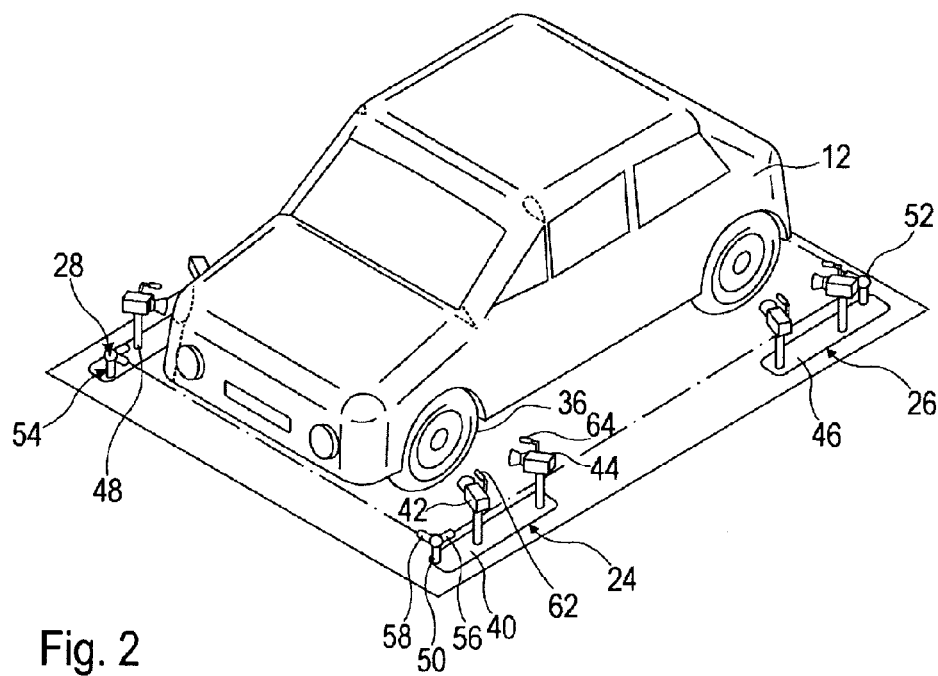
FIG. 2 shows a further measuring site comprising the vehicle of FIG. 1.

FIG. 2 shows a further measuring site 20 comprising a motor vehicle 12, wherein again three measuring units 24, 26, 28 are shown, while the fourth measuring unit is covered up through the motor vehicle 12.

The measuring units 14, 16, 18 include a ground plate 30 and two cameras 32, 34, respectively, which are directed under different angles to the corresponding wheel 36 of the motor vehicle 12. The two cameras 32, 34 comprise a respective light source 62, 64 that illuminate the wheel 36.

Figure 4:
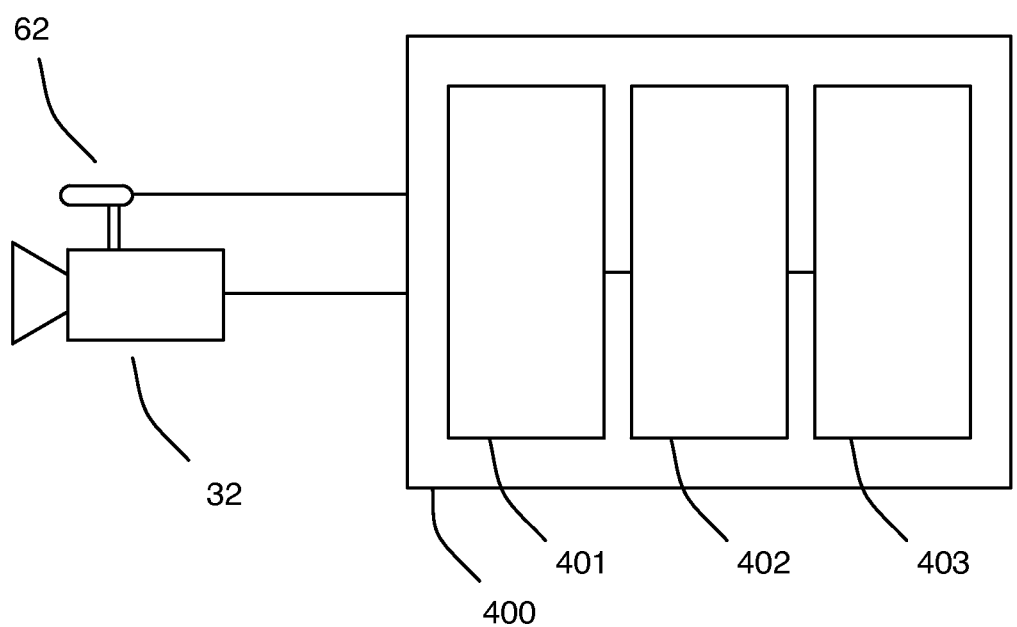

The two cameras 32, 34 and the two light sources 62, 64 comprise respective interfaces that are not shown in the FIGS. 1 and 2, but are shown in FIG. 4 in greater detail, wherein connections that are not shown in the FIGS. 1 and 2 as well adjoin to the interfaces, which connections connect the two cameras 32, 34 and the two light sources 62, 64 with a computer system that also shown in FIG. 4. The computer system can also be connected with a measuring system in a wireless manner (radio data transmission).

The computer system 400 comprises an image processing—and image pre-processing unit 401 and 402 respectively, which is capable to receive the captured images of the two cameras 32, 34 and to determine from these images features of the images that are specific for the case of application. This is known to the skilled person for example from the patent application DE 10 2004 013 441.3 and does not need to be discussed any further.

The computer system further comprises an evaluating unit 403, which is capable to generate control parameters for the two light sources 62, 64 and for the two cameras 32, 34, namely from the captured images of the two cameras 32, 34 and from the specific features determined by the image processing—and, respectively, image pre-processing-unit.

The control parameters for the two light sources 62, 64 are the illumination time and the intensity of illumination; the control parameter for the two cameras 32, 34 is substantially the exposure time. Furthermore, with more costly cameras also the setting of the diaphragm, the objective setting, the focus setting and filters that are possibly provided can be controlled.

In the embodiment of FIG. 1 the measuring units 14, 16, 18 are mounted on the measuring site 10 in a stationary manner, wherein the relative angle positions of the measuring units among themselves as well their distances are set when mounting and then remain unchanged.

In the embodiment of FIG. 2 the measuring units 24, 26, 28 again comprise a ground plate 40 and two cameras 42, 44 having a respective light source 62, 64 which are directed under different angles to the corresponding wheel 36. On the ground plates 40, 46, 48 of the measuring units 24, 26, 28, reference system measuring heads 50, 52, 54 are provided which allow an optical measurement of the relative angle positions and the distances of the measuring units 24, 26, 28 (and of the measuring unit covered up through the motor vehicle 12). For this purpose, each measuring head, for example the measuring head 50 has two transmitter/receiver units 56, 58 that are directed to the measuring head facing in longitudinal direction of the motor vehicle and, respectively, to the measuring head facing transversely in relation to the motor vehicle. The positions and the distances of the measuring units to each other are determined and calculated by the reference system.

The calibration of the stereo measuring system includes the calibration of the "inner camera parameters" and the calibration of the mounting position of the measuring units. As "inner parameters" all parameters are denoted which are camera-specific, i.e. that are fixed through the assembly of the camera. Inner parameters are determined through the mounting position of the optical sensor, the objective and its mounting position, the diaphragm setting and the focus setting. In zoom objectives the set focal length is decisive additionally. The inner parameters can be considered constant as long as no mechanical alteration of the camera or alteration of the objective setting is being made. The parameters are determined with the aid of completely known objects. At present the calibration using a 3D object is preferred, as for example an arrangement of plane targets having many sufficiently significant/distinctive points in different spatial positions.

The calibration of the mounting position upon mounting of two cameras in a measuring unit to form a stereo-measuring system must be made with respect to the coordinate system of the measuring unit. For this purpose, respective mounting axles, installation surfaces and/or index pins are provided on the measuring unit, with respect to which both the installed reference measurement system as well as the stereo-measuring system can be calibrated. Alternatively an optical calibration can be made.

The measurement of the reference system data is identical with the method in the known systems for measuring a running gear/wheel alignment systems with the exception of the distance measurement. Results of the measurement of the reference system are the position of the single measuring units with respect to each other, including distance and the position of the single measuring unit with respect to a vertical plane. The distance measurement is carried out through the angle measurement of two light emitting diodes (LEDs) having a known distance.

The quality of the illumination of the stereo-measuring system is examined with the aid of the available measurement images. Therein sufficient segmentability, i.e. the quality of the contrast of the shadow borderline is examined. If no sufficient segmentability is present, the illumination is readjusted. The quality of the illumination setting can depend not only from the contrast circumstances at the shadow borderline. If the valve or other elements are measured, other criteria can play a role as well.

Figure 3:
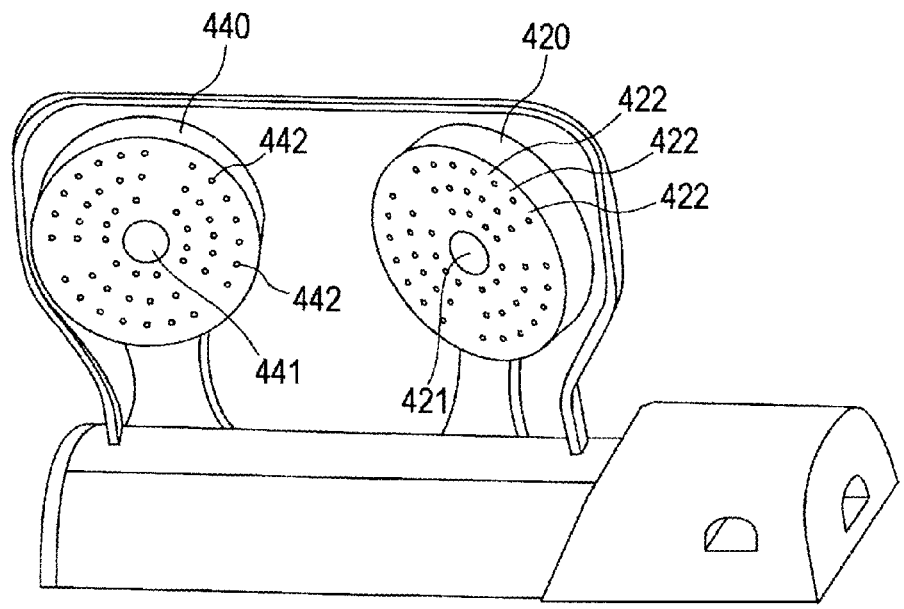
FIG. 3 shows a front view of two combined illuminating and image recording units that are arranged side by side; and, FIG. 4 shows a view of the computer system and subcomponents.

FIG. 3 shows a front view of two combined illuminating and image recording units 420 and 440, being arranged side by side.

They comprise, respectively, a surface being substantially directed forwards in the center of which respective integrated cameras 421 and 441 are arranged. Around the integrated cameras 421 and 441 a number of illuminating diodes (LEDs) 420 and 442 are arranged which point into the same direction as the integrated cameras 421 and 441, namely according to the representation in FIG. 3 in a forward direction.

The combined illuminating and image recording units 420 and 440 have a compact configuration. In the embodiment according to FIG. 3 for each of the two combined illuminating and image recording units 420 and 440 a plurality of LEDs 422 and 442 are provided, respectively.

By an exposure control of these LEDs 422 and 442 the intensity of illumination can be set and adjusted individually to the measuring requirements.

The combined illuminating and image recording units 420 and 440 are arranged on a holder, in which the connections for the data transmission of the integrated cameras 421 and 441 and the control- and the power supply lines for the integrated cameras 421 and 441 and the LEDs 422 and 424 run.

The method for automatic measured value-dependent setting of the image recording and the exposure for the measuring sites 10 and 20 is described in detail as follows:

At first the light sources 62 and 64 are switched on and operated with a predetermined intensity of illumination. When the combined illumination and image recording units 420 and 440 are used, a predetermined number of LEDs 422 and 442 is switched on.

Then an image of the wheel is captured by the cameras 32, 34 or 42, 44 or 421, 441 and it is transmitted to the image processing—and, respectively, image pre-processing-unit, which determines specific features from the image in a conventional manner which is known to the skilled person.

Subsequently, the evaluating unit generates control parameters for the cameras 32, 34 or 42, 44 or 421, 441 and for the light sources 62, 64 or for the LEDs 422, 442. Accordingly the control parameters, illumination time, intensity of illumination as well as exposure time, objective setting, diaphragm focus and filter settings are changed and the preceding method steps are repeated for the changed control parameters.

The respective specific features that have been generated newly, are compared with the previous specific features, thereby it is possible to evaluate the quality of the captured image, for example by distribution of points, etc. Furthermore it can be decided based on the comparison of the features and control parameters of the last run and before, if a further modification of the control parameters is to be carried out, or if the control parameters are to be maintained like in the respective last run of the method steps.

By this method the results of the contactless measurement of the running gear/contactless wheel alignment measurement can be significantly improved, since an optimal illumination of the object, in this case of the wheel 36 is ensured.

The decision if the generated control parameters are sufficient of if the control parameters have to be modified, and the decision in which direction and by which value the control parameters have to be modified are effected by means of quality criteria, which relate for example to the specific features and the surrounding image points. Furthermore, these decisions can be effected on the basis of the stability and on the basis of variations of specific features and the control parameters.

Also an iterative control on the basis of the generated specific features and the control parameters is possible which for example readjusts the control parameters in the opposite direction, when it is detected that deterioration of the quality of the specific features has occurred.

For practical reasons a dynamic threshold value can be determined which allows permanent after-parameterization or prevents it.

Likewise it is possible that the modification of the control parameters is effected by user interaction.

While the invention has been described with reference to exemplary embodiments, it will be understood by those skilled in the art that various changes may be made and equivalents may be substituted for elements thereof without departing from the scope of the invention. In addition, many modifications may be made to adapt the particular situation or material to the teachings of the invention without departing from the essential scope thereof. Therefore, it is intended that the invention not be limited to the particular embodiment disclosed, but that the invention include all embodiments falling within the scope of the dependent claims.

The invention claimed is:

1. A method for automatic measured value-dependent setting of image recording and exposure for an automobile service device or wheel alignment system measuring in a contactless manner comprising:

directing two respective cameras (32, 34; 42, 44; 421, 441) under different angles to a wheel (36) of a motor vehicle (12);

operating an illuminating unit (62, 64; 422, 442) associated with each camera selected from said two respective cameras (32, 34; 42, 44; 421, 441) with a predetermined intensity of illumination;

capturing at least one image of said wheel (36) or a wheel rim by said two respective cameras (32, 34; 42, 44; 421, 441);

transmitting image(s) of said wheel (36) or said wheel rim to an image processing-unit and, respectively, image pre-processing-unit;

determining specific features of said image(s) of said wheel (36) or said wheel rim by said image processing-unit and, respectively, image pre-processing-unit using image processing and image pre-processing, by examining an entire image portion or a partial image portion for significant geometric forms and by a rough pre-segmentation in order to find concentric circles, and by determining image portions to be evaluated in an area of circles, of segments of a circle between tire and rim and of circumferential lines of said circles;

generating control parameters for said illuminating unit (62, 64; 422, 442) and/or for said two respective cameras (32, 34; 42, 44; 421, 441) from said image(s) and from said specific features; and, controlling said illuminating unit (62, 64; 422, 442) and/or said cameras (32, 34; 42, 44; 421, 441) with said control parameters.

2. The method of claim 1, wherein said determining of said specific features of said image(s) of said wheel (36) or said wheel rim further comprises blinding out parts of image portions for optimization of illumination in particularly relevant portions, including in topmost and lowermost and, respectively, foremost and most rearward rim portions.

3. The method of claim 1, further comprising repeating said method with changed settings of said illuminating unit (62, 64; 422, 442) and/or said two respective cameras (32, 34; 42, 44; 421, 441) and another image portion.

4. The method of claim 1, wherein said control parameters are determined according to fixed quality criteria.

5. An automatic illuminating and image recording system for an automobile service device or wheel alignment system measuring in a contactless manner comprising:

at least two cameras (32, 34; 42, 44; 421, 441) being directed to a respective corresponding wheel (36) of a motor vehicle (12) under different angles, said cameras having interfaces to a control unit;

at least one illuminating unit (62, 64; 422, 442) associated with each camera selected from said at least two cameras (32, 34; 42, 44; 421, 441), said illuminating unit having a control input;

a control unit comprising an interface to said at least two cameras (32, 34; 42, 44; 421, 441);

an interface to said at least one illuminating unit (62, 64; 422, 442);

an image processing-unit and, respectively, image pre-processing-unit, configured such that it receives images from said at least two cameras (32, 34; 42, 44; 421, 441) and that it determines specific features of an image using image processing and image pre-processing and that for generation of control parameters an image portion is dynamically selectable, by examining an entire image portion for significant geometric forms and roughly pre-segmenting said entire image portion in order to find concentric circles, and by determining said image portion to be evaluated in an area of circles, of segments of a circle between tire and rim and of circumferential lines of said circles; and, an evaluating unit which is configured such that it generates control parameters for said at least one illuminating unit (62, 64; 422, 442) and/or for said at least two cameras (32, 34; 42, 44; 421, 441) from said images of said at least two cameras (32, 34; 42, 44; 421, 441) and from said specific features determined by said image processing-unit and, respectively, image pre-processing-unit.

6. The automatic illuminating and image recording system of claim 5, wherein said at least two cameras (32, 34; 42, 44; 421, 441) are formed as a Complimentary Metal-Oxide-Semiconductor(CMOS)-camera or Charge-Coupled Device (CCD)-camera.

7. The automatic illuminating and image recording system of claim 5, wherein said at least two camera (32, 34; 42, 44; 421, 441) comprise:
electronics;
integrated housing components;
an objective;
a filter, or a band-pass filter for optimizing an Infrared (IR)-signal in regards to an IR-spectrum of sunlight and for blinding out ambient light; and,
a power supply.

8. The automatic illuminating and image recording system of claim 5, wherein said at least one illuminating unit (62, 64; 422, 442) is configured to illuminate in a visible or non-visible or Infrared (IR)-range.

9. The automatic illuminating and image recording system of claim 5, wherein said at least one illuminating unit is formed from Light Emitting Diode (LED) lights (422, 442).

10. The automatic illuminating and image recording system of claim 5, wherein a plurality of illuminating units (422, 442) are arranged around an optical receiving unit (421, 441) in an annular manner.

11. The automatic illuminating and image recording system of claim 5, wherein illuminating units (422, 442) are respectively arranged together with a camera (421, 441) selected from said at least two cameras.

12. The automatic illuminating and image recording system of claim 5, wherein said image processing-unit and, respectively, image pre-processing-unit captures a wheel rim, a wheel house edge, a contact area, a valve position, wheel nuts, a balancing weight, an emblem at said wheel rim, or a writing on a tire.

13. The automatic illuminating and image recording system of claim 5, wherein said image processing-unit and, respectively, image pre-processing-unit and/or said evaluating unit is configured such that for the dynamic selection of said image portion, parts of the image portion are blinded out in order to optimize illumination in particularly relevant portions, including in topmost and lowermost and, respectively, foremost and most rearward rim portions.

14. The automatic illumination and image recording system of claim 13 wherein said evaluating unit is configured such that selection of said image portion is repeated with another basic setting of said at least one illuminating unit and/or said at least two cameras.

15. The automatic illumination and image recording system of claim 5, wherein said any one of image processing-unit and, respectively, image pre-processing-unit, said evaluating unit is configured such that for a dynamic selection of said image portion
a partial portion of the image, including a ¼ or a ⅛ image portion is examined for significant geometric forms and roughly pre-segmented in order to find concentric circles;
said image portion to be evaluated is determined, including in said area of circles, of segments of a circle between tire and rim and of circumferential lines of said circle;
parts of said image portion are blinded out in order to optimize illumination in particularly relevant portions, including in topmost and lowermost and, respectively, foremost and most rearward rim portions; and,
control parameters are determined for a set image portion.

16. The automatic illuminating and image recording system of claim 5, wherein said control parameters for said at least one illuminating unit (62, 64; 422, 442) are illuminating time and/or intensity of illumination.

17. The automatic illuminating and image recording system of claim 5, wherein said control parameters for said at least two camera(s) (32, 34; 42, 44; 421, 441) are exposure time and/or diaphragm setting and/or objective setting and/or filter settings.

\* \* \* \* \*